United States Patent
Fontignie et al.

(10) Patent No.: US 9,086,892 B2
(45) Date of Patent: Jul. 21, 2015

(54) DIRECT MIGRATION OF SOFTWARE IMAGES WITH STREAMING TECHNIQUE

(75) Inventors: Jacques Fontignie, Onex (CH); Claudio Marinelli, Rome (IT); Paolo Scotton, Rueschlikon (CH); Marc Vuilleumier Stueckelberg, Geneva (CH)

(73) Assignee: International Business Machines Corporation, Armonk, NY (US)

( * ) Notice: Subject to any disclaimer, the term of this patent is extended or adjusted under 35 U.S.C. 154(b) by 257 days.

(21) Appl. No.: 13/882,247

(22) PCT Filed: Nov. 3, 2011

(86) PCT No.: PCT/EP2011/069306
§ 371 (c)(1),
(2), (4) Date: Apr. 29, 2013

(87) PCT Pub. No.: WO2012/069297
PCT Pub. Date: May 31, 2012

(65) Prior Publication Data
US 2013/0219161 A1 Aug. 22, 2013

(30) Foreign Application Priority Data
Nov. 23, 2010 (EP) .................................. 10192219

(51) Int. Cl.
G06F 9/44 (2006.01)
G06F 9/445 (2006.01)

(52) U.S. Cl.
CPC ................ G06F 9/4401 (2013.01); G06F 8/63 (2013.01)

(58) Field of Classification Search
CPC ................................ G06F 8/63; G06F 9/4416
USPC ............................................................ 713/2
See application file for complete search history.

(56) References Cited

U.S. PATENT DOCUMENTS

| 6,098,158 A | 8/2000 | Lay et al. |
| 6,567,774 B1 | 5/2003 | Lee et al. |

(Continued)

FOREIGN PATENT DOCUMENTS

| CA | 2817109 A1 | 6/2012 |
| CN | 101256527 A | 9/2008 |

(Continued)

OTHER PUBLICATIONS

Black, "Streaming Execution Mode," Application Streaming with VMware® ThinApp™, Information Guide, VMware, Inc., Jun. 8, 2009 8 pages.

(Continued)

Primary Examiner — Albert Wang
(74) Attorney, Agent, or Firm — Francis Lammes; Stephen J. Walder, Jr.; Thomas E. Tyson

(57) ABSTRACT

A mechanism is provided for migrating a software image installed on a source data-processing entity to a target data-processing entity. The target data-processing entity is booted from a preliminary bootstrap program. The software image is mounted as a remote mass memory on the target data-processing entity. A primary bootstrap program of the software image is copied onto a local mass memory of the target data-processing entity. The target data-processing entity is re-booted from the primary bootstrap program thereby loading a streaming function, and serving each request of accessing a memory block on the target data-processing entity by the streaming function. In response to the memory block missing from the local mass storage, the streaming function downloads the memory block from the software image and stores the memory block into the local mass memory. Otherwise, the streaming function retrieves the memory block from the local mass memory otherwise.

20 Claims, 10 Drawing Sheets

(56) References Cited

U.S. PATENT DOCUMENTS

| | | | |
|---|---|---|---|
| 6,857,069 | B1 | 2/2005 | Rissmeyer et al. |
| 6,920,555 | B1 | 7/2005 | Peters et al. |
| 6,925,533 | B2 | 8/2005 | Lewis |
| 6,973,447 | B1 | 12/2005 | Aguilar et al. |
| 7,062,517 | B2 | 6/2006 | Kodama |
| 7,103,747 | B2 | 9/2006 | Wilson et al. |
| 7,269,722 | B1 | 9/2007 | Neary |
| 7,360,072 | B1 | 4/2008 | Soltis et al. |
| 7,379,982 | B2 | 5/2008 | Tabbara |
| 7,428,636 | B1 | 9/2008 | Waldspurger et al. |
| 7,490,197 | B2 | 2/2009 | Kirshenbaum et al. |
| 7,509,530 | B2 | 3/2009 | Welts |
| 7,512,833 | B1 | 3/2009 | Murphy et al. |
| 7,614,050 | B2 | 11/2009 | Sasaki et al. |
| 7,653,794 | B2 | 1/2010 | Michael et al. |
| 7,664,834 | B2 | 2/2010 | Keith, Jr. |
| 7,809,919 | B2 | 10/2010 | Thompson |
| 8,112,505 | B1 | 2/2012 | Ben-Shaul et al. |
| 8,230,095 | B2 | 7/2012 | Tsui et al. |
| 8,510,352 | B2 | 8/2013 | Mehra et al. |
| 8,527,728 | B2 | 9/2013 | Clerc et al. |
| 2002/0073201 | A1 | 6/2002 | French et al. |
| 2003/0126242 | A1 | 7/2003 | Chang |
| 2003/0191623 | A1 | 10/2003 | Salmonsen |
| 2003/0225986 | A1 | 12/2003 | Teshima |
| 2004/0010708 | A1 | 1/2004 | Johnson et al. |
| 2004/0010787 | A1 | 1/2004 | Traut et al. |
| 2004/0030822 | A1 | 2/2004 | Rajan et al. |
| 2004/0088367 | A1 | 5/2004 | Reinke |
| 2004/0268345 | A1 | 12/2004 | Lodwick et al. |
| 2005/0160150 | A1 | 7/2005 | Kao |
| 2006/0031547 | A1 | 2/2006 | Tsui et al. |
| 2006/0080385 | A1 | 4/2006 | Blandford et al. |
| 2007/0220494 | A1 | 9/2007 | Spooner |
| 2008/0010639 | A1 | 1/2008 | Bestmann |
| 2008/0027950 | A1 | 1/2008 | Fukumi |
| 2008/0040714 | A1 | 2/2008 | Wheeler et al. |
| 2008/0133208 | A1 | 6/2008 | Stringham |
| 2008/0141015 | A1 | 6/2008 | Chalemin et al. |
| 2008/0155245 | A1* | 6/2008 | Lipscombe et al. ............. 713/2 |
| 2008/0256219 | A1 | 10/2008 | Zhang et al. |
| 2008/0301425 | A1 | 12/2008 | Mittapalli et al. |
| 2009/0037649 | A1 | 2/2009 | Xu |
| 2009/0049160 | A1 | 2/2009 | Cherian et al. |
| 2009/0193245 | A1 | 7/2009 | Isaacson |
| 2009/0240953 | A1 | 9/2009 | Paul |
| 2010/0037235 | A1 | 2/2010 | Larimore et al. |
| 2010/0138827 | A1 | 6/2010 | Frank et al. |
| 2010/0174894 | A1 | 7/2010 | Chen et al. |
| 2010/0205594 | A1 | 8/2010 | Jirka |
| 2011/0219372 | A1 | 9/2011 | Agrawal et al. |
| 2011/0231844 | A1 | 9/2011 | Ben-Shaul et al. |
| 2011/0264776 | A1 | 10/2011 | Clerc et al. |
| 2012/0005467 | A1* | 1/2012 | Butler et al. ............. 713/2 |
| 2012/0151202 | A1 | 6/2012 | Clerc et al. |
| 2012/0311564 | A1 | 12/2012 | Khalid |
| 2013/0024680 | A1 | 1/2013 | Heidingsfeld et al. |
| 2013/0179856 | A1 | 7/2013 | Lam |
| 2013/0219161 | A1 | 8/2013 | Fontignie et al. |
| 2013/0232329 | A1 | 9/2013 | Marinelli et al. |
| 2013/0247020 | A1 | 9/2013 | Fontignie et al. |

FOREIGN PATENT DOCUMENTS

| | | | |
|---|---|---|---|
| CN | 102567042 | A | 7/2012 |
| CN | 102591675 | A | 7/2012 |
| CN | 103221921 | A | 7/2013 |
| CN | 103250134 | A | 8/2013 |
| CN | 103250163 | A | 8/2013 |
| DE | 112011103880 | T5 | 8/2013 |
| DE | 112011104325 | T5 | 9/2013 |
| DE | 112011104356 | B4 | 5/2014 |
| EP | 0770950 | A2 | 5/1997 |
| GB | 2499956 | A | 9/2013 |
| GB | 2499964 | B | 12/2013 |
| GB | 2499963 | B | 3/2014 |
| JP | 2008003815 | A | 1/2008 |
| JP | 2012128839 | A | 7/2012 |
| JP | 2012128841 | A | 7/2012 |
| JP | 2013543192 | A | 11/2013 |
| JP | 2013545204 | A | 12/2013 |
| JP | 2014505286 | A | 2/2014 |
| SG | 158757 | A1 | 2/2010 |
| WO | 02091099 | A2 | 11/2002 |
| WO | WO 02/091099 | A2 | 11/2002 |
| WO | 2008049008 | A2 | 4/2008 |
| WO | 2008115012 | A1 | 9/2008 |
| WO | 2012069297 | A1 | 5/2012 |
| WO | 2012076266 | A1 | 6/2012 |
| WO | 2012079864 | A1 | 6/2012 |

OTHER PUBLICATIONS

Clerc et al., "Deploying an operating system," Filed on Apr. 27, 2010, p. 1-26, E.P. Patent Application No. 10425138.4.

Clerc et al., "Management of Multiple Software Images With Relocation of Boot Blocks," Filed on Dec. 14, 2010, p. 1-49, E.P. Patent Application No. 10194866.9.

Clerc et al., "Management of Multiple Software Images With Shared Memory Blocks," Filed on Dec. 14, 2010, p. 1-49, E.P. Patent Application No. 10194864.4.

EDP Weekly, "SANRAD and emBoot team to deliver iSCSI diskless boot," EDP Weekly's IT Monitor, Jul. 18, 2005, Millin Publishing, Inc., Gale Group, http://www.thefreelibrary.com/_/print/PrintArticle.aspx?id=134957464, Accessed on: Apr. 22, 2010, 2 pages.

Etherboot.org, "Etherboot/gPXE Wiki," The Etherboot Project Community, Last modified: Mar. 26, 2011, http://etherboot.org/wiki/index.php, Accessed on: Oct. 3, 2014, 4 pages.

Fegreus, "Real Magic with Virtual Snapshots," Open Mag, Mar. 3, 2008, http://www.open-mag.com/100348.shtml, Accessed on: Apr. 22, 2010, 1 page.

Fontignie et al., "Direct Migration of Software Images With Steaming Technique," Filed on Nov. 23, 2010, p. 1-38, E.P. Patent Application No. 10192219.3.

Fontignie et al., "Computer-readable storage mediums for encrypting and decrypting a virtual disc," Filed on Dec. 9, 2010, p. 1-41, E.P. Patent Application No. 10194400.7.

Fontignie et al., "Upgrade of Software Images Based on Streaming Techniqhe," Filed on Dec. 13, 2010, p. 1-39, E.P. Patent Application No. 10194709.1.

Fontignie et al., "Computer-Readable Storage Mediums for Encrypting and Decrypting a Virtual Disc," Filed on Nov. 3, 2011, p. 1-41, I.N. Patent Application No. 4481/CHENP/2013.

Fontignie et al., "Upgrade of Software Images Based on Streaming Technique," filed May 24, 2013, p. 1-42, U.S. Appl. No. 13/989,673.

Fontignie et al., "Encrypting and Decrypting a Virtual Disc," filed Sep. 8, 2014, p. 1-28, U.S. Appl. No. 14/479,475.

Fontignie et al., "Upgrade of Software Images Based on Streaming Technique," filed Sep. 25, 2014, p. 1-43, U.S. Appl. No. 14/496,353.

HP, "HP Image Manager," Product documentation, May 27, 2009, Version 4, Hewlett-Packard Development Company, L.P., http://www8.hp.com/h20195/v2/GetHTML.aspx?docname=c04140545, Accessed on: Oct. 3, 2014, 3 pages.

IBM, "iBoot—Remote Boot over iSCSI," Storage Research, https://www.research.ibm.com/haifa/projects/storage/iboot/index.html, Accessed on: Oct. 3, 2014, 1 page.

IBM System X, "BladeBoot SAN Guide," Software-Based iSCSI Boot SAN Guide for IBM Blades, Jun. 6, 2008, Version 2.02, IBM Corp., 24 pages.

Madden, "A better way to manage Citrix servers: Centralized block-level disk image streaming," Block-level Disk Streaming for Citrix Servers, Mar. 2006, 9 pages.

Ni et al., "Security enhanced virtual disk encryption system and technology," Journal of Computer Applications, Nov. 2009, vol. 29, No. 11, 4 pages.

(56) References Cited

OTHER PUBLICATIONS

Q Archive, "Data Security and Disk Encryption Software Creates virtual encrypted disk on your system," http://encrypted-disk.qarchive.org/, Accessed on: Apr. 30, 2010, 5 pages.

Shinder, "What is Dynamic Virtual Client Computing? Or, What's the Problem with VDI and Why XP Mode is a Good Thing," WindowsNetworking.com, Sep. 8, 2009, TechGenix Ltd., http://www.windowsnetworking.com/articles-tutorials/netgeneral/What-Dynamic-Virtual-Client-Computing-Whats-Problem-VDI-Why-XP-Mode-Good-Thing.html, Accessed on: Apr. 22, 2010, 4 pages.

Suzaki et al., "TPM + Internet Virtual Disk + Platform Trust Services = Internet Client," ASPLOS '08, 2008, http://openlab.ring.gr.jp/oscircular/ASPLOS08-poster-leaflet.pdf, accessed on Nov. 7, 2014, 1 page.

Van Hensbergen et al., "Dynamic Policy Disk Caching for Storage Networking," IBM Research Report, Nov. 28, 2006, IBM Research Division, 13 pages.

VMware, "VMware Workstation 6.5 Beta Release Notes," ACE Management Server Administrator's Manual, Aug. 14, 2008, Workstation Version 6.5, VMware, Inc., http://www.vmware.com/products/beta/ws/releasenotes_ws65_beta.html, Accessed on: Oct. 3, 2014, 8 pages.

Youngssoft, "CCBoot," Diskless Boot WinXP/Win2003/Vista/Win2008 with iSCSI, Feb. 2009, Quick Start, www.ccboot.com, 15 pages.

* cited by examiner

DIRECT MIGRATION OF SOFTWARE IMAGES WITH STREAMING TECHNIQUE

BACKGROUND

The solution according to one or more embodiments of the present invention relates to the data-processing field. More specifically, this solution relates to the migration of software images.

Migration of software images is a critical activity in large data-processing systems comprising a high number of computers. Generally speaking, a software image is a structure that includes software modules residing on a computer—either of a physical type or emulated by a virtual machine (for example, its operative system, application programs, and/or data).

The process of migrating software images (or simply migration process) may be of a staged type or of a direct type. In a staged migration process, a master software image of a master computer is captured and stored into a central repository; a server computer then controls the deployment of the master software image to any desired target clients. Conversely, in a direct migration process the software image of one or more source clients is directly transferred to the target clients; the direct migration process is faster and simpler (since it can occur directly from the source clients without the need of any central repository, with the possibility of distributing a corresponding workload on multiple source clients).

With reference in particular to the direct migration process, different approaches have been proposed in the art.

Particularly, in a migration process of the cold type the source client is stopped to capture its software image (so as to ensure that the software image reflects a consistent state of the source client). The cold migration process may work between source and target clients that have either homogeneous platforms or heterogeneous platforms; however, the cold migration process is very slow, since both the source client and the target client are unavailable for the whole time required to migrate the full software image (of the order of hours). Instead, in a migration process of the hot type the source client is only paused for the time required to capture a consistent state thereof (while the actual transfer of the software image to the target client occurs transparently to the source client that can work normally). The hot migration process is fast on the source client (since it remains unavailable only for the time required to capture its state, of the order of minutes); however, the hot migration process is only applicable between virtual machines running on homogenous platforms. Likewise, in a migration process of the live type the source client is only paused for the time required to encapsulate the state thereof into a shared file. The live migration process is very fast on the source client (since its unavailability is of the order of seconds); however, the live migration process as well is only applicable between virtual machines running on homogenous platforms. In any case, in both the hot migration process and the live migration process the target client is available only after the full software image has been transferred thereto (i.e., after some hours from the beginning of the migration process).

Moreover, U.S. Pat. No. 7,512,833 (the entire disclosure of which is herein incorporated by reference) discloses a method for cloning an operative system to computers having different hardware configurations. For this purpose, a master image of the operative system is created by capturing the content of a disk of a master computer wherein it has been previously installed; files, drivers and registry settings of the master image are then stripped down to a minimum basic level removing software and hardware incompatibility, so as to make the master image bootable on different computers.

US-A-2008/0301425 (the entire disclosure of which is herein incorporated by reference) discloses a method for supporting a remote boot of a host. For this purpose, a management controller of the host includes a remote access initiator that loads a kernel of an initial operative system image into the host from a remote access target; the kernel then uses its own remote access initiator to load another operative system image from the remote access target. This allows the remote boot of the host even without any LAN on motherboard (LOM) device.

US-A-2006/0031547 (the entire disclosure of which is herein incorporated by reference) discloses a method for integrated on-demand delivery of operative systems and application programs. For this purpose, the operative systems are delivered in streaming to clients from corresponding images on streaming servers—i.e., blocks thereof are downloaded from the network when they are needed (with further blocks that are pre-fetched while the blocks already received are used), with the possible addition of a local cache function; the application programs are likewise delivered in streaming from separate images. The management of the operative systems is computer specific, while the management of the application programs is user specific—so as to avoid the need of building combined operative system and application program images for each user.

US-A-2010/0174894 (the entire disclosure of which is herein incorporated by reference) discloses a method for configuring an operative system of a target computer of the diskless type. For this purpose, a configuration image of a donor computer is copied onto a virtual disk, and it is then modified according to a hardware configuration of the target computer—so as to allow its next booting from the virtual disk.

SUMMARY

In its general terms, the solution according to one or more embodiments of the present invention is based on the idea of migrating the software image with a streaming technique.

Particularly, one or more aspects of the solution according to specific embodiments of the invention are set out in the independent claims, with advantageous features of the same solution that are set out in the dependent claims, whose wording is herein incorporated verbatim by reference (with any advantageous feature provided with reference to a specific aspect of the solution according to an embodiment of the invention that applies mutatis mutandis to every other aspect thereof).

More specifically, an aspect of the solution according to an embodiment of the invention provides a migration method for migrating a software image installed on a source data-processing entity (for example, a source computer or a source virtual machine) to a target data-processing entity (for example, a target computer or a target virtual machine). The migration method includes the following steps. The target data-processing entity is booted from a preliminary bootstrap program providing a standalone preliminary operative system (for example, from a network bootstrap program or a temporary bootstrap virtual disk). The software image is then mounted as a remote mass memory on the target data-processing entity (for example, by acting as a remote access initiator), A primary bootstrap program of the software image is copied onto a local mass memory of the target data-processing entity (for example, by mounting the software image in access-on-copy mode); the primary bootstrap program comprises a streaming function adapted to migrate the software image to the target data-processing entity. The target data-processing entity is re-booted from the primary bootstrap program on the local mass memory of the target data-processing entity, thereby loading the streaming function. Each request of accessing a memory block on the target data-processing entity is then served by the streaming function; the streaming function downloads the memory block from the software image installed on the source data-processing entity and stores it into the local mass memory of the target data-processing entity in response to a lacking of the memory block in the local mass memory of the target data-processing entity; otherwise, the streaming function retrieves the memory block from the local mass memory of the target data-processing entity.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present, invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The solution according to one or more embodiments of the invention, as well as further features and the advantages thereof, will be best understood with reference to the following detailed description, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes—such as its value, content and representation). Particularly.

DETAILED DESCRIPTION

Figure 1:
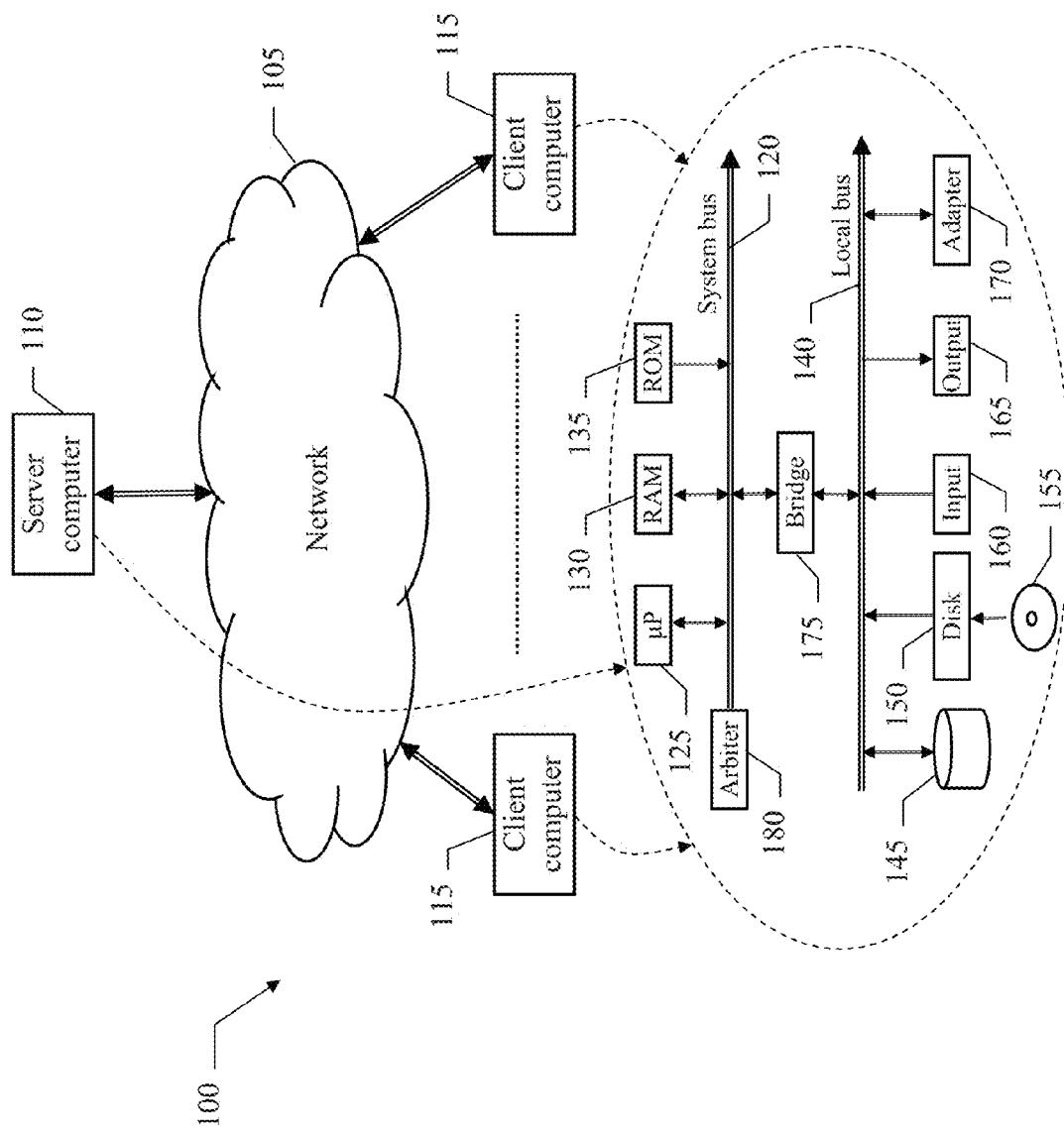
FIG. 1 shows a schematic block diagram of a data-processing system in which the solution according to an embodiment of the invention is applicable.

With reference in particular to FIG. 1, there is shown a schematic block diagram of a data-processing system (or simply system) 100 in which the solution according to an embodiment of the invention is applicable. The system 100 has a distributed architecture, which is based on a network 105—for example, a Local Area Network (LAN). Multiple computers are connected one to another through the network 105. Particularly, a server computer 110 controls migration processes of the direct type, wherein software images are directly transferred between different client computers 115—only two shown in the figure for the sake of simplicity; each software image is a structure that includes one or more software modules (for example, operative systems, application programs, and/or data). During each migration process, a source client—consisting of either a (physical) computer 115 or a virtual machine running thereon—provides a corresponding software image that is already installed thereon; a target client—again consisting of either a (physical) computer 115 or a virtual machine running thereon—downloads and installs the software image from the source client. In this respect, it is pointed out that the terms source client and target client merely identify dynamic roles that may change over time in different migration processes (for example, with a source client of a migration process that may act as a target client in a next migration process, or a target client of a migration process that may act as a source client in a next migration process); moreover, any number of source clients and/or target clients may be active at the same time (even with a single source client serving multiple target clients concurrently).

A generic (server or client) computer of the system 100 is formed by several units that are connected in parallel to a system bus 120 (with a structure that is suitably scaled according to the actual function of the computer in the system). In detail, one or more microprocessors (μP) 125 control operation of the computer; a RAM 130 is directly used as a working memory by the microprocessors 125, and a ROM 135 stores basic code of the computer. Several peripheral units are clustered around a local bus 140 (by means of respective interfaces). Particularly, a mass memory consists of one or more hard-disks 145 and drives 150 for reading optical disks 155 (for example, DVDs or CDs). Moreover, the computer includes input units 160 (for example, a keyboard and a mouse), and output units 165 (for example, a monitor and a printer). An adapter 170 is used to connect the computer to the network 105, A bridge unit 175 interfaces the system bus 120 with the local bus 140. Each microprocessor 125 and the bridge unit 175 can operate as master agent requesting an access to the system bus 120 for transmitting information. An arbiter 180 manages the granting of the access with mutual exclusion to the system bus 120.

A conceptual representation of a migration process according to an embodiment of the invention is shown in FIG. 2A-FIG. 2H.

Figure 2A:
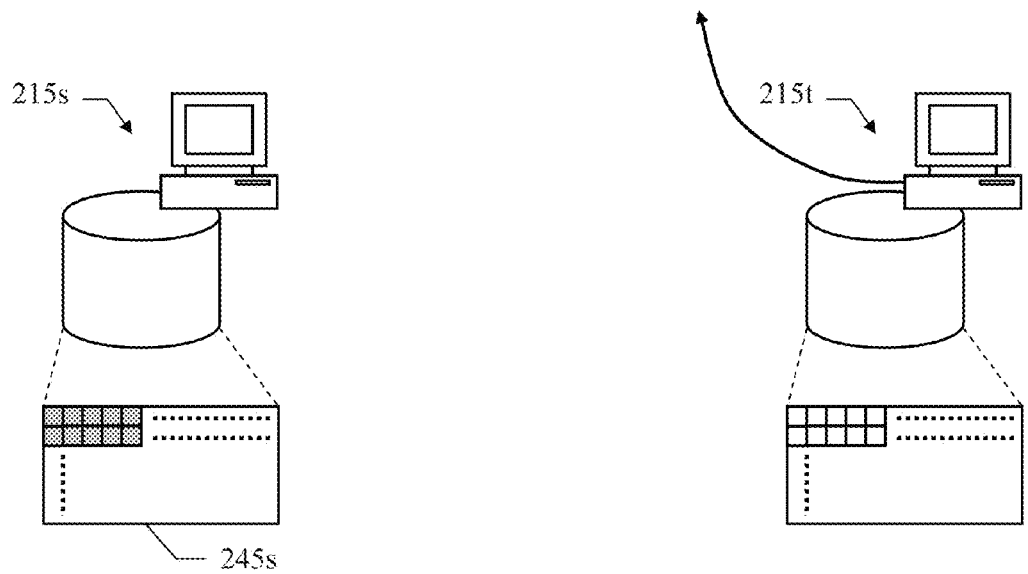
FIG. 2A-FIG. 2H show a conceptual representation of a migration process according to an embodiment of the invention.

Starting from the FIG. 2A, the migration process is from a source client 215s to a target client 215t. For this purpose, a source disk 245s of the source client 215s is prepared, so as to provide a software image thereof in a consistent state for its remote access by the target client 215t (for example, by booting the corresponding physical computer in a safe mode or by turning off the corresponding virtual machine). The target client 215t is then booted from an (external) preliminary bootstrap program providing a standalone preliminary operative system (or minimal operative system) only offering its basic functionalities (for example, by booting the corresponding physical computer from a network bootstrap program or by booting the corresponding virtual machine from a temporary bootstrap virtual disk); in this way, the booting of the target client 215*t* is always possible in any condition thereof—i.e., even when no (functioning) operative system is available.

Figure 2B:
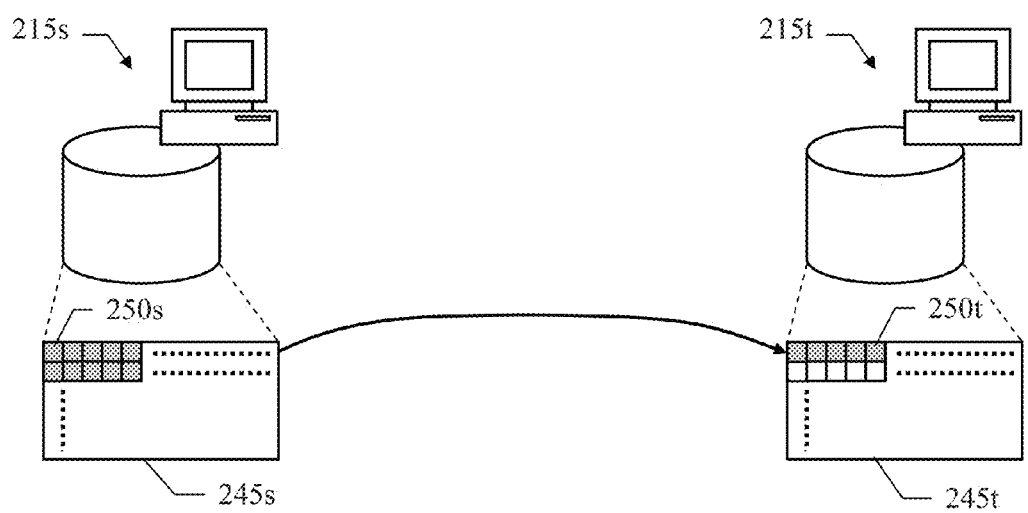

Moving to the FIG. 2B, the source disk 245*s* is mounted remotely on the target client 215*t*; a primary bootstrap program 250*s* included in the source disk 245*s* is then copied onto a target disk 245*t* of the target computer 215*t*, so as to obtain a corresponding primary bootstrap program 250*t* (for example, by mounting the source disk 245*s* in a copy-on-access mode).

Figure 2C:
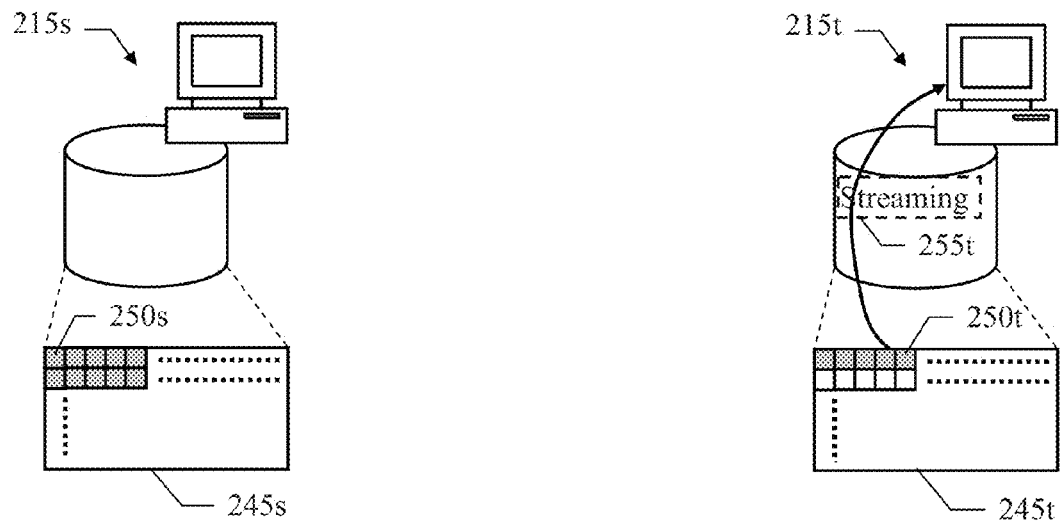

At this point, as shown in the FIG. 2C, the target client 215*t* is re-booted normally from the primary bootstrap program 250*t* on the target disk 245*t* (so as to provide a complete operative system offering all its functionalities). The bootstrap of the target client 215*t* causes the loading of a streaming driver 255*t* included in the primary bootstrap program 250*t* (which overrides a standard file-system driver thereof).

Figure 2D:
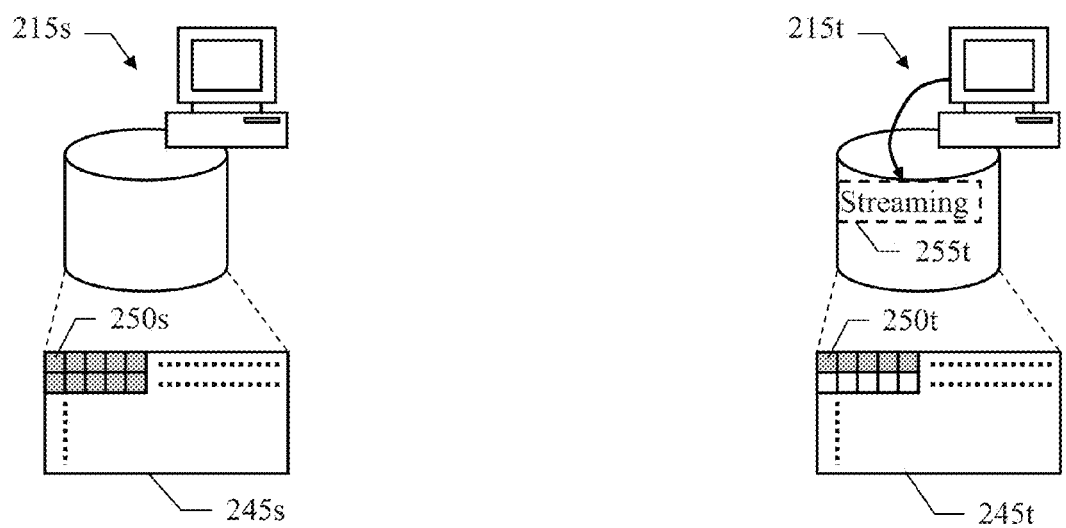

With reference now to the FIG. 2D, every request of accessing a memory block on the target client 215*t* during its operation is thus served by the streaming driver 255*t*; the memory block may include any kind of information that has to be accessed by the target client 215*t* (for example, one or more sectors, files, libraries, directories, combinations or portions thereof, either relating to the operative system or the application programs).

Figure 2E:
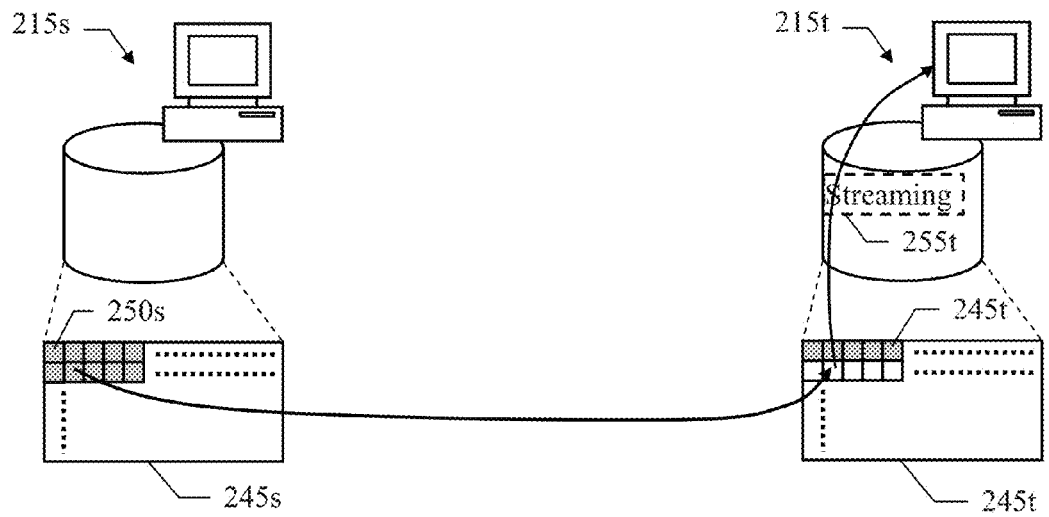

When the requested memory block is lacking in the target disk 245*t*, as in the case of the FIG. 2E, the streaming driver 255*t* downloads the memory block from the source image 245*s* and then stores it into the target disk 245*t*.

Figure 2F:
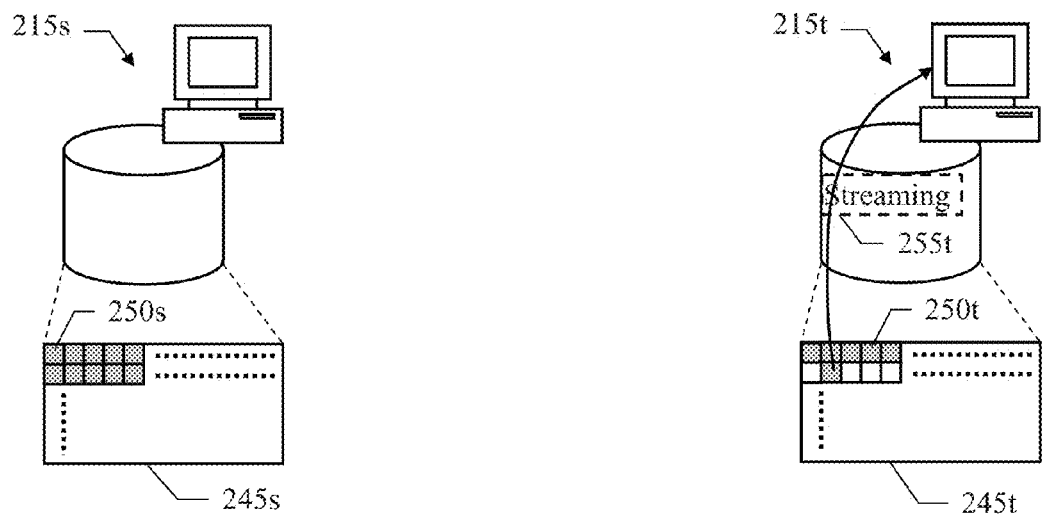

Conversely, when the requested memory block is already available in the target disk 245*t*, as in the case of the FIG. 2F, the streaming driver 255*t* retrieves the memory block from the target disk 245*t* directly.

Figure 2G:
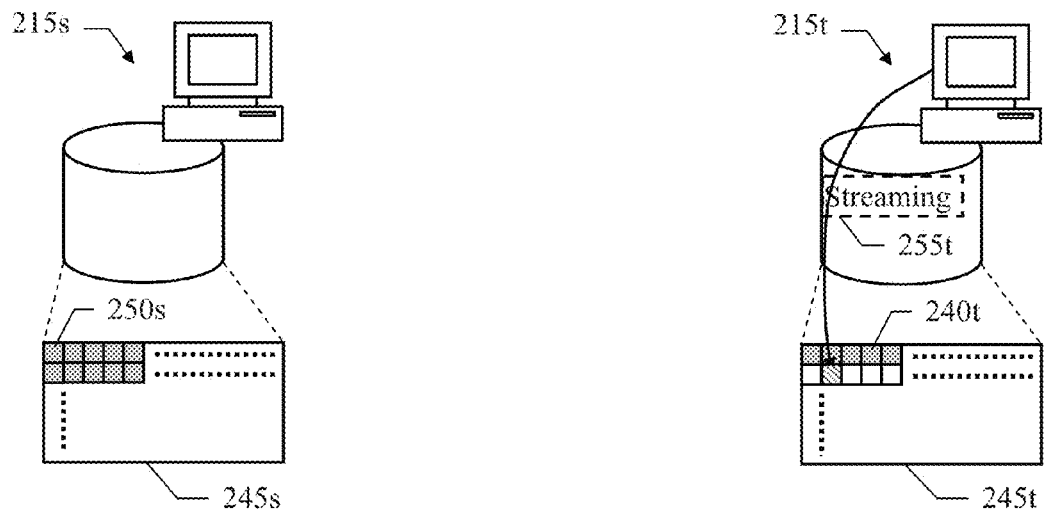

Moving to the FIG. 2G, if a memory block has to be written onto the target client 215*t*, the update is only applied to the memory block stored in the target disk 245*t*—which memory block is always available therein since it should have been read before its writing. Therefore, the target disk 245*s* can be updated normally (as it was already completely transferred to the target client 215*t*) even when the migration process is still in progress.

Figure 2H:
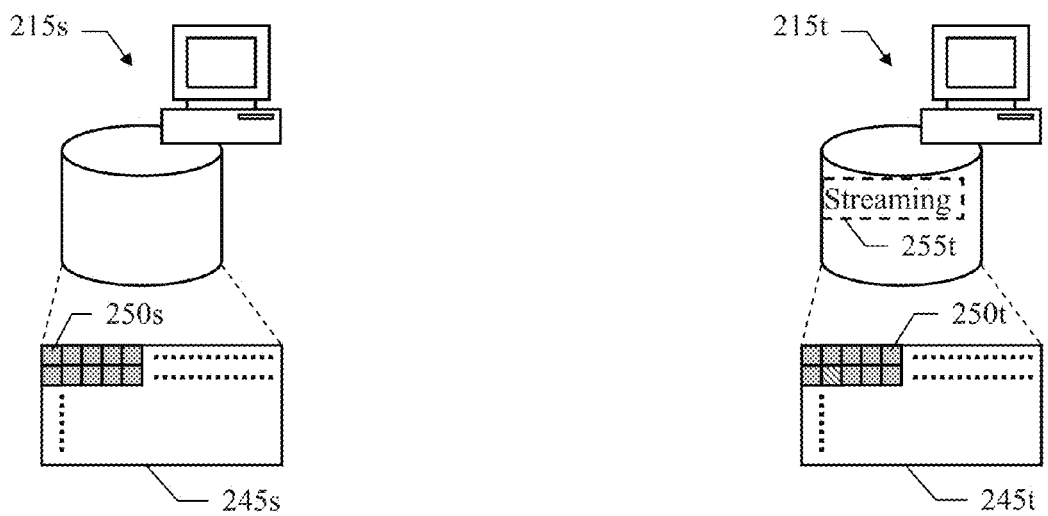

With reference at the end to the FIG. 2H, ultimately all the memory blocks of the source disk 245*s* are stored on the target disk 245*t*. At this point, the migration process is complete (since the whole source disk 245*s* has been transferred from the source client 215*s* to the target client 215*t*, with the addition of possible local updates in the meanwhile). Operation of the target client 215*t* is now completely independent of the source client 215*s* (with the streaming function 255*t* that can be disabled, so as to access the memory blocks directly from the target disk 245*t*).

The above-described solution provides a direct migration process (occurring directly from the source client 215*s* without the need of any central repository, with the possibility of distributing the workload on multiple source clients) that is very fast, since the source client 215*s* remains unavailable only for a short time required to prepare the source disk 245*s* for its remote access by the target client 215*t* Moreover, in this case the target client 215*t* as well is available after a short time. Indeed, the target client 215*t* can now be used immediately, just after the primary bootstrap program 250*s* has been copied onto the target disk 245*t* (even if the migration process is still in progress). The operation of the target client 215*t* is then entirely normal, irrespectively of the availability or not of the other memory blocks of the source disk 245*s* in the target disk 245*t* (with only a slight degradation of performance of the target client 215*t* when it accesses memory blocks that are still to be downloaded from the source disk 245*s*); however, once the transfer of the source disk 245*s* onto the target disk 245*t* has been completed, the target client 215*t* works autonomously (without any need of the source client 215*s*) as if a conventional migration process had been performed.

In this respect, it should be noted that the above-described streaming function has nothing to do with the streaming techniques that are known in the art for providing operative system and/or application program images on demand. Indeed, in the known streaming techniques blocks of the operative system and/or application program images are downloaded onto the target client only for their immediate use. However, these blocks are not stored permanently on the target client (i.e., they disappear after they have been used, and in any case after the target client is turned off), so that the target client can never be disconnected from the server computer. Indeed, even when the blocks are pre-fetched they remain on the target client only until their (possible) next use; likewise, even when a local cache for the memory blocks is implemented, only few memory blocks remain in the local cache for their re-use (in any case, with the least recently used memory blocks in the local cache that are ultimately evicted for storing new memory blocks). Conversely, in the present streaming function all the memory blocks of the source disk 245*s* are always stored onto the target disk 245*t* (once they have been downloaded from the source client 215*s*); indeed, in this case the migration process is aimed at creating a whole copy of the source disk 245*s* on the target client 215*t* for its standalone operation.

Moreover, the initial booting of the target client 215*t* in the minimal operative system allows migrating the source disk 245*s* to any type of target client 215*t* (provided that the minimal operative system is compatible with the one of the source client 215*s*—i.e., it supports its file system); therefore, it is now possible to attain a very fast migration process even between source and target clients with heterogeneous platforms—for example, virtual machines running on different hypervisors (in any case, based on a same hardware architecture—for example, x86).

The above-described migration process provides a single mechanism that supports both physical computers and virtual machines (in any combination); particularly, an implementation thereof for physical computers is immediately applicable to virtual machines as well (with a beneficial impact on its time-to-market).

Different exemplary implementations of the solution according to corresponding embodiments of the invention are shown in FIG. 3-FIG. 6. For this purpose, each figure provides a collaboration diagram representing the roles of the main software components that may be used to implement the corresponding migration process. Particularly, the figure describes the static structure of the system (by means of the corresponding components) and its dynamic behavior (by means of a series of exchanged messages, each one representing a corresponding action, denoted with progressive sequence numbers preceded by the symbol "A"). The information (programs and data) is typically stored on the hard-disk and loaded (at least partially) into the working memory of each computer when the programs are running. The programs are initially installed onto the hard disks, for example, from DVDs.

Figure 3:
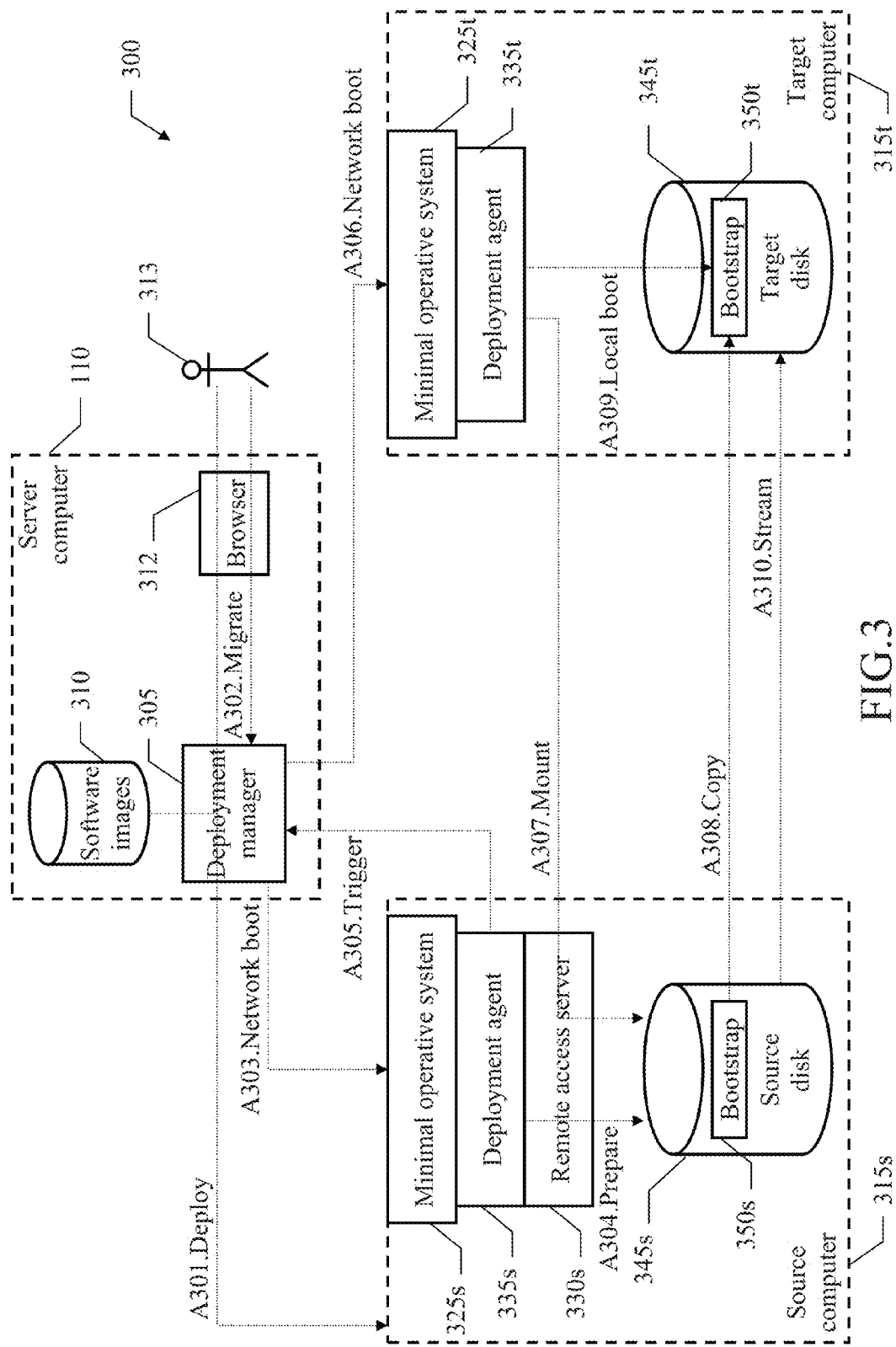
FIG. 3-FIG. 6 show different exemplary implementations of the solution according to corresponding embodiments of the invention.

Starting from the FIG. 3, there is shown an exemplary implementation of a migration process of a Physical-to-Physical (P2P) type, wherein both the source client and the target client are (physical) computers. The software components that may be used to implement this migration process are denoted as a whole with the reference 300.

Particularly, the server computer 110 runs a deployment manager 305—for example, the IBM Tivoli Provisioning Manager for Images (or TPMfI) of the IBM Tivoli Provisioning Manager for OS Deployment (or TPM for OSD) by IBM Corporation (IBM and Tivoli are trademarks of IBM Corporation); the deployment manager 305 is used to automate the deployment of operative systems and/or application programs remotely from the server computer 110 onto the client computers of the system. For this purpose, the deployment manager 305 manages a repository of software images 310. A browser 312 is used by an operator 313 to interact with the deployment manager 305.

As usual, a selected software image 310 is deployed onto a source computer 315s under the control of the deployment manager 305 (action "A301. Deploy").

At this point, in the solution according to an embodiment of the invention the operative system and/or application programs installed on the source computer 315s can be migrated directly to a target computer 315t. For this purpose, the operator 313 selects (on the deployment manager 305) the source computer 315s and the target computer 315t for the migration process (action "A302.Migrate"). In response thereto, the deployment manager 305 turns off (if necessary) and then turns on the source computer 315s—for example, by means of a Wake on LAN (WoL) service—by forcing it to boot over the network (action "A303.Network boot"). For this purpose, the source computer 315s launches a network boot loader—for example, the Preboot Execution Environment (PXE) embedded in its network adapter. The network boot loader exploits a dynamic address service—for example, based on the Dynamic Flost Configuration Protocol (DHCP)—to obtain a dynamic address for the source computer 315s; particularly, the network boot loader broadcasts a corresponding request, which is served by the server computer 110 (acting as a DHCP server). The network boot loader then broadcasts a bootstrap request, which is again served by the server computer 110 returning an address of a network bootstrap program; the network boot loader downloads—for example, through the Trivial File Transfer Protocol (TFTP)—the network bootstrap program into a RAM disk (i.e., a portion of working memory treated as a mass memory), and then launches it. The network bootstrap program—for example, the Windows Preinstallation Environment (WinPE). Windows being a trademark of Microsoft Corporation—provides a minimal operative system 325s for the source computer 315s (i.e., without mounting any disk); therefore, the source computer 315s operates in a completely safe mode, wherein no change can be applied to its state in the mass memory. The minimal operative system 325s includes a remote access server 330s for allowing accessing data remotely—for example, based on the Internet Small Computer System Interface (iSCSI) protocol—and a deployment agent 335s for interacting with the deployment manager 305. At this point, the deployment agent 335s prepares a source disk 345s of the software image of the client computer 315s for its remote access through the remote access server 330s—by simply defining it as an iSCSI target in the example at issue; particularly, the source image 345s includes a corresponding bootstrap program 350s. The deployment agent 335s can now turn off and then turn on the source computer 315s normally for allowing its regular operation (action "A304.Prepare").

At this point, the deployment agent 335s triggers a transfer action to the target computer 315t, by sending a corresponding message to the deployment manager 305 (action "A305.Trigger"). In response thereto, the deployment manager 305 turns off (if necessary) and then turns on the target, computer 315t by forcing it to boot over the network (action "A306.Network boot"). As above, the target computer 315t launches a network boot loader (for example, the PXE), which exploits a dynamic address service (for example, the DHCP) to obtain a dynamic address for the target computer 315t (from the server computer 110), and then downloads a network, bootstrap program from the server computer 110 and launches it. The network bootstrap program (for example, the WinPE) provides a minimal operative system 325t for the target, computer 315t. The minimal operative system 325t includes a deployment agent 335t for interacting with the deployment, manager 305. The deployment agent 355t mounts the source disk 345s as a remote disk (i.e., by acting as an iSCSI initiator in the example at issue) for accessing it remotely through the remote access server 330s (action "A307.Mount"); the source disk 345s is mounted in an access-on-copy mode, so that any memory block of the source disk 345s being accessed by the target computer 315t is automatically copied into its target disk 345t Particularly, the deployment agent 355t accesses the bootstrap program 350s of the source disk 345s (including the corresponding deployment agent); the bootstrap program 350s also includes a streaming driver for transferring the rest of the source disk 345s in streaming. Since the source disk 345s has been, mounted in an access-on-copy mode, this causes the copy of the bootstrap program 350s to the target disk 345t as a corresponding bootstrap program 350t (action "A308.Copy").

At this point, the deployment agent 335t turns off and then turns on the target computer 315t normally. Therefore, a boot loader stored in a firmware of the target computer 315t that is executed at its turn on—for example, the Basic Input/Output System (BIOS)—now finds the bootstrap program 350t in the target disk 345t, so that it boots locally from it (action "A309.Local boot"). In this way, the bootstrap program 350t now provides a complete operative system for the target computer 315t. Particularly, the complete operative system includes the streaming driver that serves each request for accessing any memory block, and provides it in streaming—as described in detail in the following (action "A310.Stream").

Figure 4:
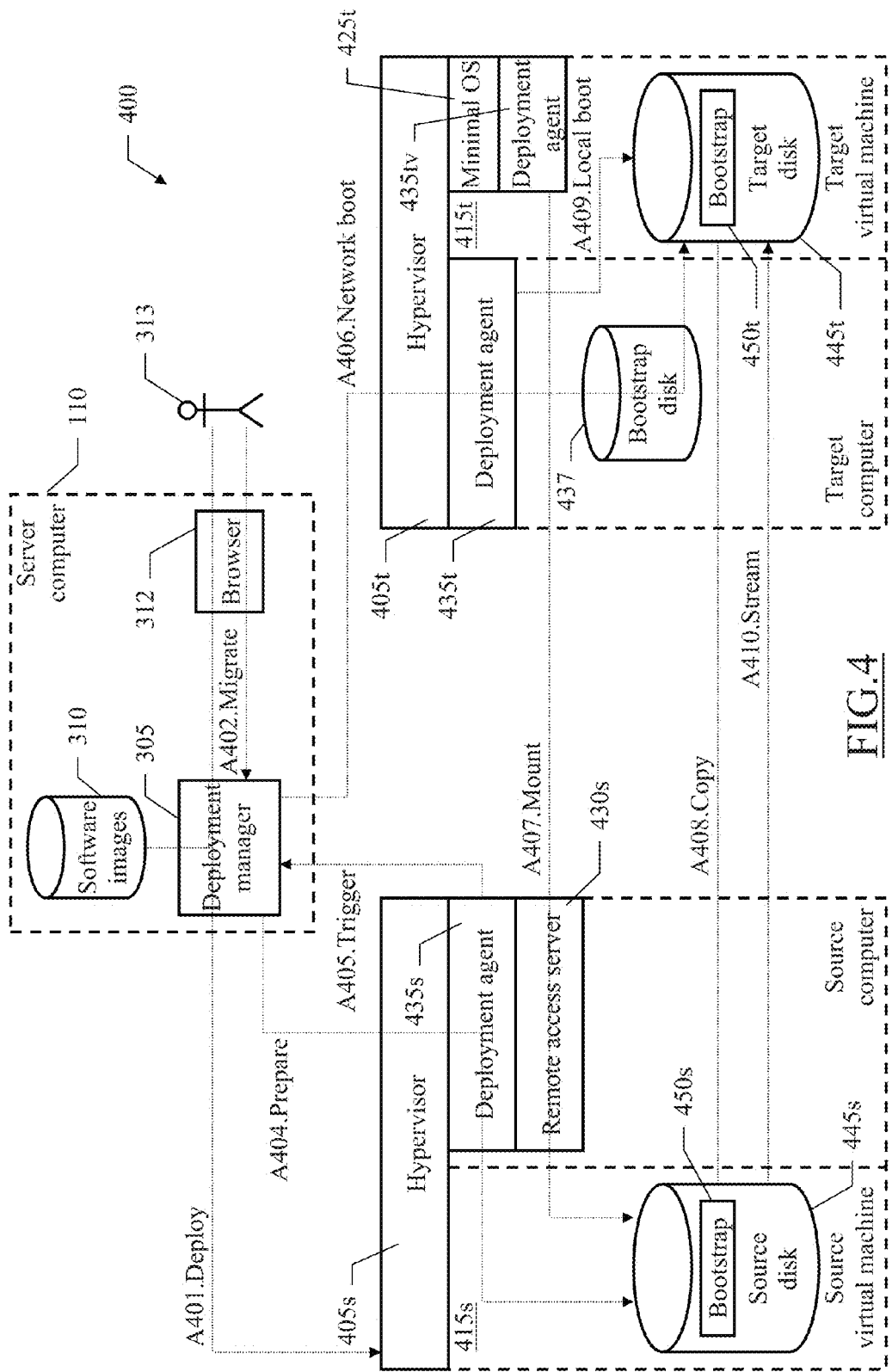

Moving to the FIG. 4, there is shown an exemplary implementation of a migration process of a Virtual-to-Virtual (V2V) type. The software components that may be used to implement this migration process are denoted as a whole with the reference 400. Particularly, a source computer and a target computer now run a hypervisor 405s and a hypervisor 405t, respectively (for example, the VMWare ESX by VMWare—VMWare being a trademark of VMWare Inc.); each hypervisor 405s, 405t implements a virlualization layer, which emulates virtual machines each one consisting of an abstract environment giving the appearance of a physical computer (which the virtual machine has sole control of). In this case, the migration process is from a source virtual machine 415s running on the hypervisor 405s to a target virtual machine 415t running on the hypervisor 405t. For this purpose, the hypervisor 405s runs a remote access server 430s (for example, based on the iSCSI protocol), and a deployment agent 435s (for interacting with the deployment manager 305); likewise, the hypervisor 405t runs a deployment agent 435t (for interacting with the deployment manager 305).

As above, the server computer 110 runs the deployment manager 305 (which manages the repository of software images 310), with the browser 312 that is used by the operator 313 to interact with it. As usual, a selected software image 310 is deployed onto the source virtual machine 415s under the control of the deployment manager 305 (action "A401.Deploy").

At this point, in the solution according to an embodiment of the invention the operator 313 selects (on the deployment manager 305) the source virtual machine 415s and the target virtual, machine 415t for the migration process (action "A402.Migrate"). In response thereto, the deployment manager 305 instructs the deployment agent 435s to turn off (if necessary) the source virtual machine 415s. The deployment agent 435s prepares a source virtual disk 445s of a software image of the source virtual machine 415s for allowing its remote access through the remote access server 430s (by simply defining it as an iSCSI target in the example at issue). The deployment agent 435s can now turn on the source virtual machine 415s for allowing its regular operation (action "A404.Prepare").

At this point, the deployment agent 435s triggers a transfer action to the target virtual machine 415t, by sending a corresponding message to the deployment manager 305 (action "A405.Trigger"). In response thereto, the deployment manager 305 instructs the deployment agent 435t to download a network bootstrap disk (for example, in the ISO format), which is stored into a bootstrap virtual disk 437. The deployment agent 435t then turns off (if necessary) the target virtual machine 415t. At this point, a boot sector—for example, the Master Boot Record (MBR)—of a target virtual disk 445t of the target virtual machine 415t—i.e., the first sector thereof that is loaded by a boot loader (for example, the BIOS)—is changed by the deployment agent 435t so as to point to the bootstrap virtual disk 437. The deployment agent 435t then turns on the target virtual machine 415t; therefore, the boot loader of the target virtual machine 415t, which identifies the target virtual disk 445t as a bootable device and loads its boot sector, is now redirected to the bootstrap virtual disk 437, thereby causing the target virtual machine 415t to boot, from it. This involves the launch of a bootstrap program (for example, the WinPE) stored on the network bootstrap disk 437, which provides a minimal operative system 425t for the target virtual machine 415t; particularly, the minimal operative system 425t includes a further deployment agent, 435tv—for interacting with the deployment manager 305 (action "A406.Network boot"). The deployment agent 435tv mounts the source virtual disk 445s as a remote disk in an access-on-copy mode (i.e., by acting as an iSCSI initiator in the example at issue), for accessing it remotely through the remote access server 430s (action "A407.Mount"). The deployment agent 455tv accesses the bootstrap program 450s of the source virtual disk 445s (including the corresponding deployment agent and the streaming driver), so as to cause its copy onto the target virtual disk 445t as a corresponding bootstrap program 450t—overriding the boot sector accordingly (action "A408.Copy").

At this point, the deployment agent 435t can delete the network bootstrap disk 437. The deployment agent 435t turns off and then turns on the target virtual machine 415t. Therefore, its boot loader now finds the bootstrap program 450t in the target virtual disk 445t, so that the target virtual machine 415t boots locally from it (action "A409.Local boot"). In this way, the bootstrap program 450t now provides a complete operative system for the target virtual machine 415t Particularly, the complete operative system includes the streaming driver that serves each request for accessing any memory block, and provides it in streaming—as described in detail in the following (action "A410.Stream").

Figure 5:
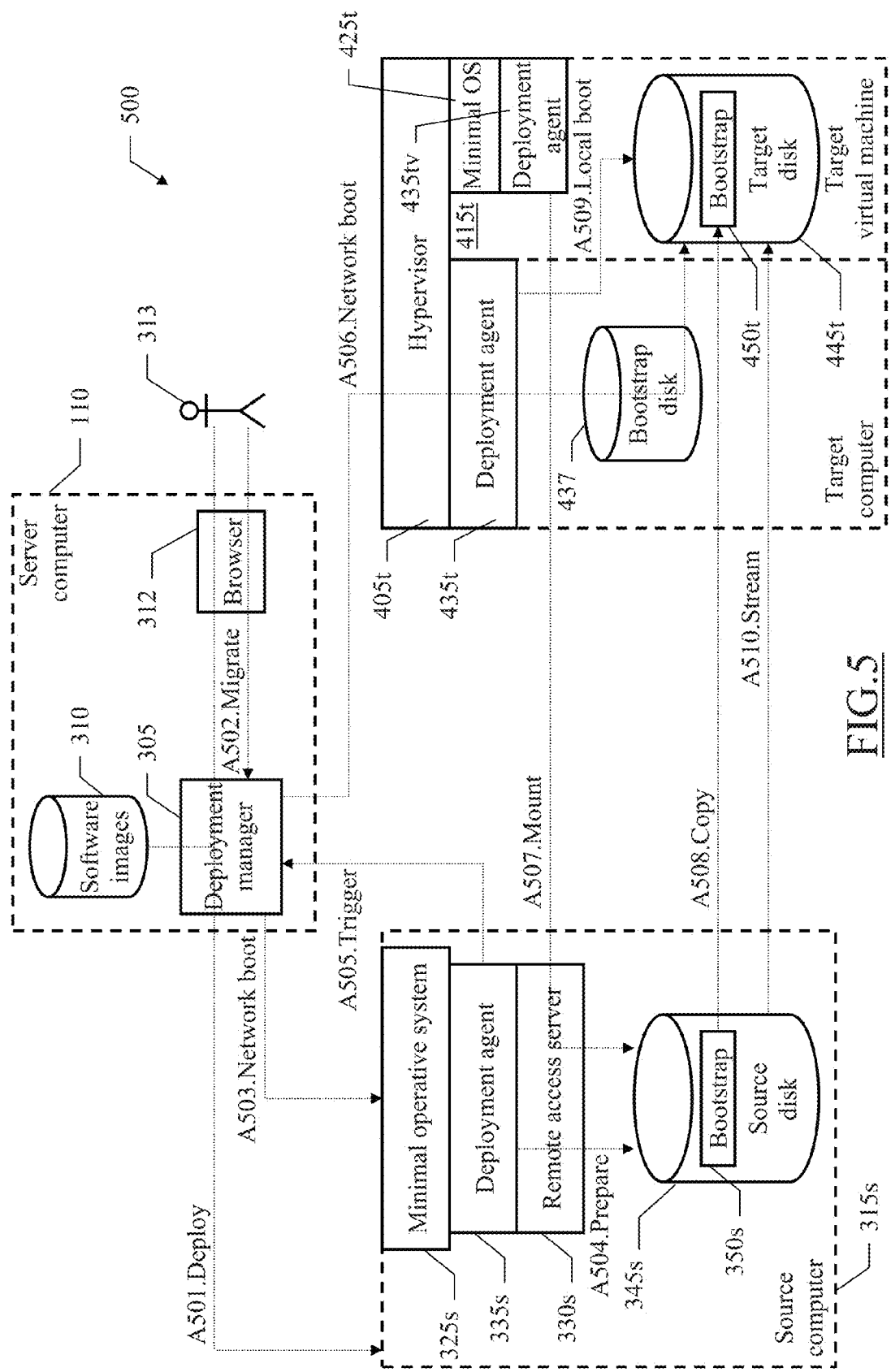

With reference now to the FIG. 5, there is shown an exemplary implementation of a migration process of a Physical to Virtual (P2V) type. The software components that may be used to implement this migration process are denoted as a whole with the reference 500. In this case, the migration process is from the source computer 315s to the target virtual machine 415t (running on the hypervisor 405t, which in turn runs the deployment agent 435t).

As above, the server computer 110 runs the deployment manager 305 (which manages the repository of software images 310), with the browser 312 that is used by the operator 313 to interact with it. As usual, a selected software image 310 is deployed onto the source computer 315s under the control of the deployment manager 305 (action "A501.Deploy").

At this point, in the solution according to an embodiment of the invention the operator 313 selects (on the deployment manager 305) the source computer 315s and the target virtual machine 415t for the migration process (action "A502.Migrate"). In response thereto, the deployment manager 305 turns off (if necessary) and then turns on the source computer 315s by forcing it to boot over the network (action "A503.Network boot"), so as to provide the minimal operative system 325s including the remote access server 330s and the deployment agent 335s. The deployment agent 335s prepares the source disk 345s for allowing its remote access through the remote access server 330s (i.e., as an iSCSI target in the example at issue). The deployment agent 335s can now turn off and then turn on the source computer 315s normally for allowing its regular operation (action "A504.Prepare").

At this point, the deployment agent 335s triggers a transfer action to the target virtual machine 415t, by sending a corresponding message to the deployment manager 305 (action "A505.Trigger"). In response thereto, the deployment manager 305 instructs the deployment agent 435t to download the bootstrap virtual disk 437. The deployment agent 435t then turns off (if necessary) the target virtual machine 415t, and it changes the boot sector (for example, the MBR) of the target virtual disk 445t so as to point to the network bootstrap disk 437. The deployment agent 435t then turns on the target virtual machine 415t, thereby causing the target virtual machine 115t to boot from the network bootstrap disk 437—so as to provide the minimal operative system 425t including the deployment agent 435tv (action "A506.Network boot"). The deployment agent 435tv mounts the source disk 345s as a remote disk in an access-on-copy mode (i.e., by acting as an iSCSI initiator in the example at issue), for accessing it remotely through the remote access server 330s (action "A507.Mount"). The deployment agent 455tv accesses the bootstrap program 350s of the source disk 345s (including the corresponding deployment agent and the streaming driver), so as to cause its copy onto the target virtual disk 445t as the corresponding bootstrap program 450t (action "A508.Copy").

At this point, the deployment agent 435t can delete the network bootstrap disk 437. The deployment agent 435t turns off and then turns on the target virtual machine 415t, so as to boot it locally from the target virtual disk 445t (action "A509.Local boot"). The complete operating environment for the target virtual machine 415t so provided includes the streaming driver, which serves each request for accessing any memory block, and provides it in streaming—as described in detail in the following (action "A510.Stream").

Figure 6:
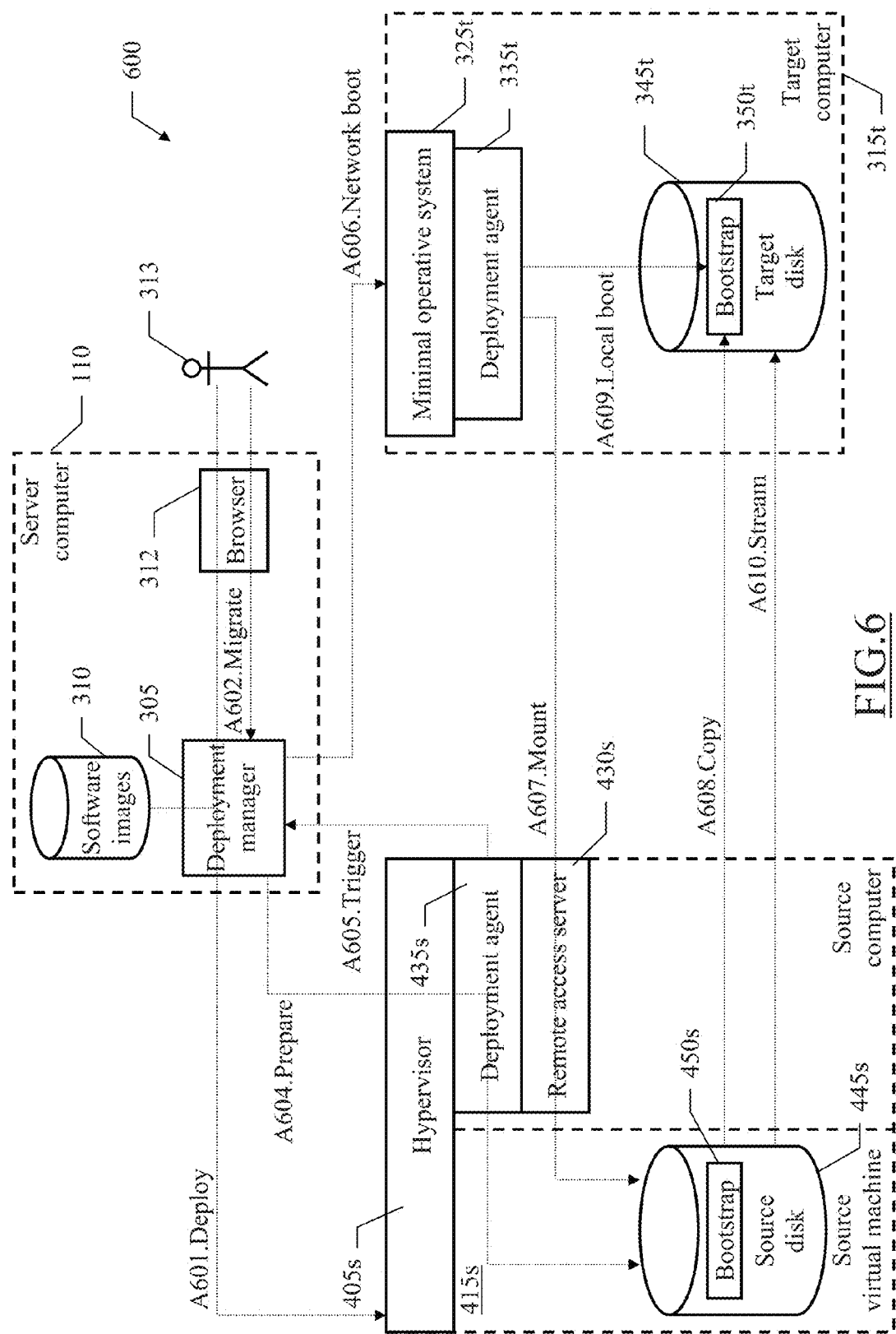

At the end, in the FIG. 6 there is shown an exemplary implementation of a migration process of a Virtual to Physical (V2P) type. The software components that may be used to implement this migration process are denoted as a whole with the reference 600. In this case, the migration process is from the source virtual machine 415s (running on the hypervisor

405s, which in turn runs the remote access server 430s and the deployment agent 435t) to the target computer 315t.

As above, the server computer 110 runs the deployment manager 305 (which manages the repository of software images 310), with the browser 312 that is used by the operator 313 to interact with it. As usual, a selected software image 310 is deployed onto the source virtual machine 315s under the control of the deployment manager 305 (action "A601.Deploy").

At this point, in the solution according to an embodiment of the invention the operator 313 selects (on the deployment manager 305) the source virtual machine 415s and the target computer 315t for the migration process (action "A602.Migrate"). In response thereto, the deployment manager 305 instructs the deployment agent 435s to turn off (if necessary) the source virtual machine 415s. The deployment agent 435s prepares the source virtual disk 445s for allowing its remote access through the remote access server 430s (i.e., by defining it as an iSCSI target in the example at issue). The deployment agent 435s can now turn on the source virtual machine 415s for allowing its regular operation (action "A604.Prepare").

At this point, the deployment agent 435s triggers a transfer action to the target computer 315t, by sending a corresponding message to the deployment manager 305 (action "A605.Trigger"). In response thereto, the deployment manager 305 turns off (if necessary) and then turns on the target computer 315t by forcing it to boot over the network (action "A606.Network boot"), so as to provide the minimal operative system 325t including the deployment agent 335t. The deployment agent 335t mounts the source virtual disk 445s as a remote disk in an access-on-copy mode (i.e., by acting as an iSCSI initiator in the example at issue) for accessing it remotely through the remote access server 430s (action "A607.Mount"). The deployment agent 335t accesses the bootstrap program 450s of the source virtual disk 445s (including the corresponding deployment agent and the streaming driver), so as to cause its copy to the target disk 345t as the corresponding bootstrap program 350t (action "A608.Copy").

At this point, the deployment agent 335t turns off and then turns on the target computer 315t normally, so as to boot it locally from the target disk 345t (action "A609.Local boot"). The complete operative system for the target computer 315t so provided includes the streaming driver, which serves each request, for accessing any memory block, and provides it in streaming—as described in detail in the following (action "A610.Stream").

Figure 7:
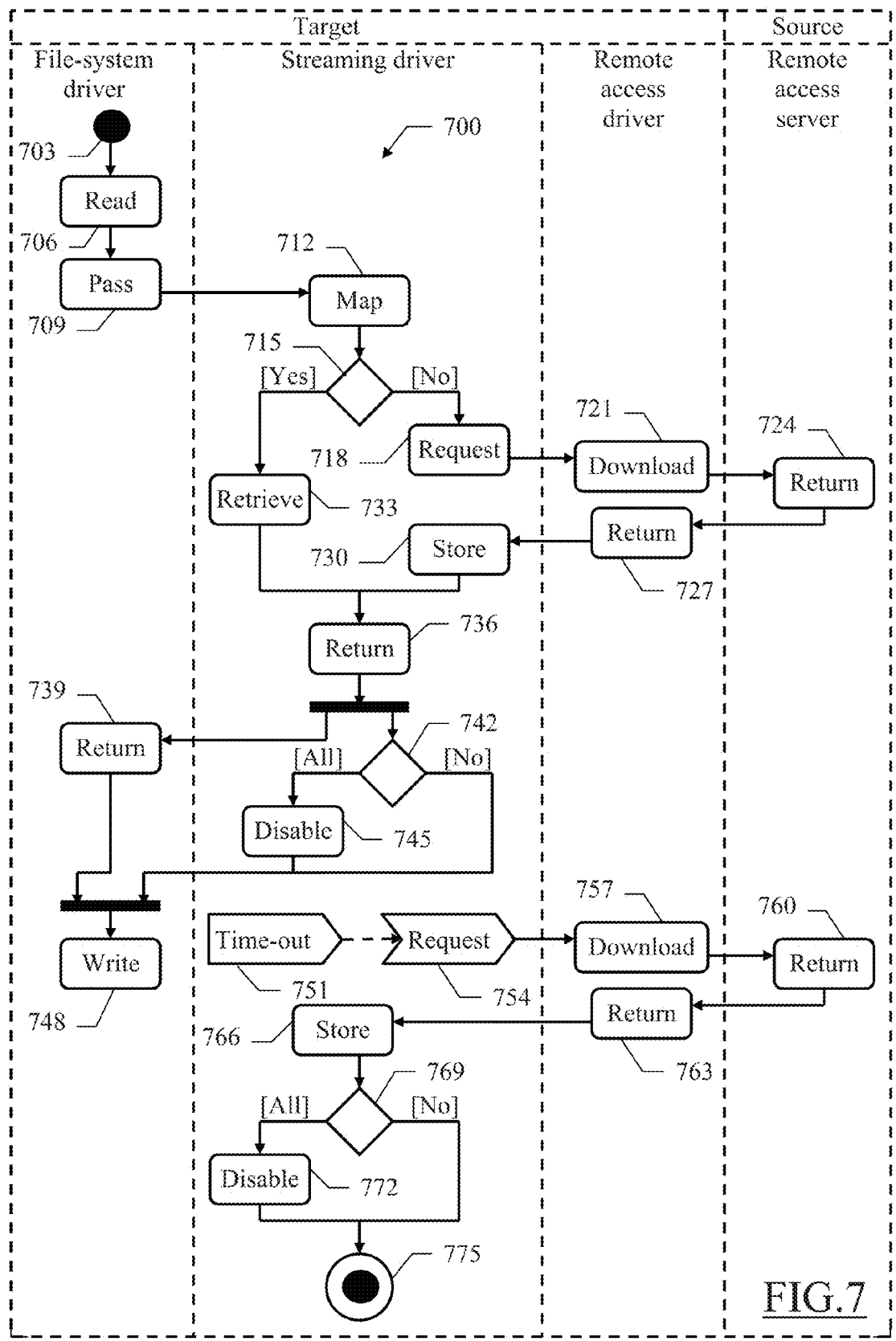
FIG. 7 shows an activity diagram describing the flow of activities relating to an implementation of the solution according to an embodiment of the invention.

In order to explain the above-mentioned streaming process, reference is now made to FIG. 7, which shows an activity diagram describing the flow of activities relating to an implementation of the solution according to an embodiment of the invention; particularly, the activity diagram represents an exemplary streaming process with a method 700.

The method 700 begins at the black start, circle 703 in the swim-lane of a file-system driver of the target client (i.e., target computer or target virtual machine), and then passes to block 706 as soon as a request, for accessing (i.e., read) a memory block is received (for example, from an application program). In response thereto, the file-system driver at block 709 passes the request to the streaming driver.

Moving to the swim-lane of the streaming driver, a verification is made at block 712 to determine whether the requested memory block is available in the target (physical or virtual) disk; for this purpose, the streaming driver accesses a location map storing this information (for example, in a bit-map including a bit for each memory block—for example, of 512 bytes—indicating its availability). The flow of activity then branches at block 715 according to the result of this verification. If the memory block is not available in the target disk (i.e., its bit in the location map is deasserted), the streaming driver at block 718 requires the memory block to a remote access driver (acting as an iSCSI initiator in the example at issue). Passing to block 721, the remote access driver submits a corresponding download request to the remote access server of the source client (i.e., source computer or source virtual machine)—providing the source (physical or virtual) disk as an iSCSI target in the example at issue. In response thereto, the remote access server returns the required memory block to the remote access driver of the target client at block 724. The remote access driver then returns the memory block so downloaded to the streaming driver at block 727. With reference now to block 730, the streaming driver stores this memory block into the target disk, and it updates the location map accordingly so as to indicate its availability (i.e., by asserting the corresponding bit). Referring back to the block 715, if the memory block is already available in the target disk (i.e., its bit is asserted), the method 700 descends into block 733, wherein the memory block is retrieved from the target disk directly. In any case, the flow of activity merges at block 736 (from either the block 730 or the block 733); in this phase, the streaming driver returns the memory block to the file-system driver. In turn, the file-system driver returns the memory block to the requiring application program at block 739. At the same time, a test is made at block 742 in the swim-lane of the streaming driver to verify whether all the memory blocks of the source disk (in a predefined number corresponding to its size) are available in the target disk (i.e., the corresponding bits in the location map are asserted). If so, the streaming driver is disabled at block 745, so that all the next requests for reading every memory block will be served directly by the file-system driver as usual; conversely, no action is performed. Returning to the swim-lane of the file-system driver, if the memory block has been also requested for writing, the request is served directly by the file-system driver at block 748; particularly, the file-system driver now writes the memory block onto the target disk (where it is always available after its reading).

In a completely asynchronous way, the streaming driver periodically verifies (for example, every 10-100 ms) a workload of the target client, of the source client and/or of the network at block 751; if the workload is lower than a predefined threshold (indicating that the corresponding resources are under-exploited at the moment—for example, because no action is performed on the target client and/or on the source client, and a traffic in the network is low), the flow of activity passes to block 754. In this phase, the streaming driver downloads a memory block that is still not available in the target disk (for example, the first one whose bit in the location map is deassereted) by repeating the same operations described above. Briefly, a corresponding request is submitted to the remote access driver, which passes it to the remote access server of the source client at block 757. The remote access server of the source client returns the required memory block to the remote access driver of the target client at block 760, which in turns returns it to the streaming driver at block 763. With, reference now to block 766, the streaming driver stores this memory block into the target disk, and it updates the location map accordingly so as to indicate its availability. A test is now made at block 769 to verify whether all the memory blocks of the source disk are stored in the target disk. If so, the streaming driver is disabled at block 772, whereas no action is performed otherwise. In both cases, the method 700 then ends at the concentric white/black stop circles 751 (from either the block 772 or the block 769).

Naturally, in order to satisfy local and specific requirements, a person skilled in the art may apply to the solution described above many logical and/or physical modifications and alterations. More specifically, although this solution has been described with a certain degree of particularity with reference to one or more embodiments thereof it should be understood that various omissions, substitutions and changes in the form and details as well as other embodiments are possible (for example, with respect to process parameters). Particularly, different embodiments of the invention may even be practiced without the specific details (such as the numerical examples) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the disclosed solution may be incorporated in any other embodiment as a matter of general design choice.

For example, similar considerations apply if the same solution is implemented with an equivalent method (by using similar steps with the same function of more steps or portions thereof, removing some steps being non-essential, or adding further optional steps); moreover, the steps may be performed in a different order, concurrently or in an interleaved way (at least in part).

Moreover, the source disk to be migrated may include any software program (for example, only the operative system without any application programs). In any case, the migration process is completely independent of how the software image has been deployed onto the source client (for example, manually); more generally, the migration process may also be implemented in a simplified system without any server computer with the deployment manager. Likewise, it is possible to copy the primary bootstrap program from the source disk to the target, disk in any other way (even with a dedicated operation when the source disk, is not mounted in an access-on-copy mode). Naturally, the memory blocks of the source disk, to be downloaded may include any other information and/or may have any other size; in addition, it is also possible to implement a pre-fetch of the memory blocks (with their downloading and storing onto the target disk in advance of a possible use thereof). Any equivalent structure may be used to provide the streaming function and to manage the availability of the memory blocks in the target disk (for example, by breaking the location map into chunks to allow their loading in the working memory of the target computer).

The above-described scenarios are merely illustrative, and they should not be interpreted in a limitative manner; for example, the migration process may be between virtual machines running on any other hypervisors, even different to each other (for example, ESX and KVM).

Alternatively, it is possible to manage the writing of the memory blocks onto the target disk as well by the streaming driver.

Different conditions can be envisaged for disabling the streaming driver (for example, when a predefined area of the target disk has been written); however, nothing prevents maintaining the streaming driver always active (for example, for downloading up-to-date versions of the memory blocks in response to a reset of the corresponding bits in the location map).

The workload may be monitored with any other frequency or only during specific periods (for example, at night); similar considerations apply if the workload is monitored only for the source client, the target client, the network, or any combination thereof. Moreover, the threshold value for the workload may be defined in any other way (for example, by weighting its contributions with different weights). Similar considerations apply if two or more memory blocks are downloaded at the same time when the workload falls below the threshold value. In any case, this feature is merely optional and in may be omitted in a simplified implementation.

The minimal operative system for the target computer may be provided by booting it from any equivalent preliminary bootstrap program (for example, the RartPE). Moreover, the desired result may also be achieved with a different network booting procedure (for example, based on the RIPL, gPXE, PXELinux, and the like) or even in another way (for example, by booting the target computer manually from a network boot CD).

Similar considerations apply to the booting of the target virtual machine; in any case, it is possible to apply the same technique for providing the minimal operative system of the target computer (i.e., its booting over the network) to the target virtual machine as well.

In any case, nothing prevents providing the booting virtual disk in a different way (for example, by loading it from a removable storage device).

Likewise, the minimal operative system for the source computer may be provided by booting it from any equivalent preliminary bootstrap program (for example, the BartPE)—with the source disk that may be prepared by any other module included therein.

Moreover, the desired result may also be achieved with a different network booting procedure (for example, based on the RIPL, gPXE, PXELinux, and the like) or even in another way (for example, by booting the source computer manually from a network boot CD).

Alternatively, the source disk may be prepared by any other module running on the hypervisor of the source computer; in any case, it is possible to apply the same technique for preparing the source disk of the source computer (i.e., based on its booting with the minimal operative system) to the source virtual machine as well.

Similar considerations apply if the program (which may be used to implement each embodiment of the invention) is structured in a different way, or if additional modules or functions are provided; likewise, the memory structures may be of other types, or may be replaced with equivalent entities (not necessarily consisting of physical storage media). The program may take any form suitable to be used by any data-processing system or in connection therewith (for example, within a virtual machine); particularly, the program may be in the form of external or resident software, firmware, or microcode (either in object code or in source code—for example, to be compiled or interpreted). Moreover, it is possible to provide the program as an article of manufacture implemented on any computer-usable medium; the medium can be any element suitable to contain, store, communicate, propagate, or transfer the program. For example, the medium may be of the electronic, magnetic, optical, electromagnetic, infrared, or semiconductor type; examples of such medium are fixed disks (where the program can be pre-loaded), removable disks, tapes, cards, wires, fibers, wireless connections, networks, broadcast waves, and the like. In any case, the solution according to an embodiment of the present invention lends itself to be implemented even with a hardware structure (for example, integrated in a chip of semiconductor material), or with a combination of software and hardware suitably programmed on otherwise configured.

Alternatively, the system has a different structure or includes equivalent components, or it has other operative characteristics. In any case, every component thereof may be separated into more elements, or two or more components may be combined together into a singe element; moreover, each component may be replicated to support the execution of the corresponding operations in parallel. It is also pointed out that any interaction between different components generally does not need to be continuous (unless specified otherwise), and it may be either direct or indirect through one or more intermediaries. Particularly, the migration process may also be carried out on a system based on a different architecture (for example, wide area, global, cellular or satellite network), and exploiting any type of (wired and/or wireless) connections. In any case, each computer may have another structure or may include similar elements (such as cache memories temporarily storing the programs or parts thereof); moreover, it is possible to replace the computer with any code execution entity (such as a PDA, a mobile phone, and the like), or with a combination of multiple entities.

The invention claimed is:

1. A migration method for migrating a software image installed on a source data-processing entity to a target data-processing entity, the migration method comprising:
   booting the target data-processing entity from a preliminary bootstrap program providing a standalone preliminary operative system,
   mounting the software image as a remote mass memory on the target data-processing entity,
   copying a primary bootstrap program of the software image onto a local mass memory of the target data-processing entity, the primary bootstrap program comprising a streaming function adapted to migrate the software image to the target data-processing entity,
   re-booting the target data-processing entity from the primary bootstrap program on the local mass memory of the target data-processing entity thereby loading the streaming function, and
   serving each request of accessing a memory block on the target data-processing entity by the streaming function, the streaming function downloading the memory block from the software image installed on the source data-processing entity and storing the memory block into the local mass memory of the target data-processing entity in response to a lacking of the memory block in the local mass memory of the target data-processing entity or retrieving the memory block from the local mass memory of the target data-processing entity otherwise.

2. The migration method according to claim 1, wherein for each request of accessing the memory block in an update mode the method further comprising:
   updating the memory block in the local mass memory of the target data-processing entity.

3. The migration method according to claim 1, further comprising:
   disabling the streaming function for retrieving each memory block directly from the local mass memory of the target data-processing entity in response to the storing of a number of memory blocks corresponding to a size of the software image in the local mass memory of the target data-processing entity.

4. The migration method according to claim 1, further comprising:
   monitoring a workload of the target data-processing entity or the source data-processing entity, and
   downloading a set of selected memory blocks being not stored in the local mass memory of the target data-processing entity from the software image installed on the source data-processing entity and storing the selected memory blocks into the local mass memory of the target data-processing entity in response to the workload falling below a threshold value.

5. The migration method according to claim 1, wherein the target data-processing entity is a target physical computer, and wherein booting the target data-processing entity from the preliminary bootstrap program comprises:
   booting the target physical computer from a network bootstrap program.

6. The migration method according to claim 1, wherein the target data-processing entity is a target virtual machine running on a target hypervisor, and wherein booting the target data-processing entity from a preliminary bootstrap program comprises:
   booting the target virtual machine from a booting virtual disk external to the target virtual machine.

7. The migration method according to claim 6, wherein booting the target virtual machine from the booting virtual disk comprises:
   downloading the booting virtual disk by the target hypervisor.

8. The migration method according to claim 6, wherein booting the target virtual machine from the booting virtual disk comprises:
   changing a boot sector of the target virtual machine to point to the booting virtual disk.

9. The migration method according to claim 1, wherein the source data-processing entity is a source physical computer, and wherein the migration method further comprises:
   booting the source physical computer from a further preliminary bootstrap program providing a further standalone preliminary operative system without mounting the software image installed on the source data-processing entity, and
   preparing the software image installed on the source data-processing entity in a consistent state for remote access thereof by the target data-processing entity.

10. The migration method according to claim 9, wherein booting the source physical computer from the further preliminary bootstrap program comprises:
    booting the source physical computer from a further network bootstrap program.

11. The migration method according to claim 1, wherein the source data-processing entity is a source virtual machine running on a source hypervisor, and wherein the migration method further comprises:
    preparing the software image installed on the source data-processing entity in a consistent state for remote access thereof by the target data-processing entity, the software image installed on the source data-processing entity being prepared with the source virtual machine in a turned off state.

12. A computer program product comprising a non-transitory computer readable medium having a computer readable program for causing a data-processing system to migrate a software image installed on a source data-processing entity to a target data-processing entity stored therein, wherein the computer readable program, when executed on the data-processing system, causes the data processing system to:
    boot the target data-processing entity from a preliminary bootstrap program providing a standalone preliminary operative system, mount the software image as a remote mass memory on the target data-processing entity, copy a primary bootstrap program of the software image onto a local mass memory of the target data-processing entity, the primary bootstrap program comprising a streaming function adapted to migrate the software image to the target data-processing entity, re-boot the target, data-processing entity from the primary bootstrap program on the local mass memory of the target data-processing entity thereby loading the streaming function, and serve each request of accessing a memory block on the target data-processing entity by the streaming function, the streaming function downloading the memory block from the software image installed on the source data-processing entity and storing the memory block into the local mass memory of the target data-processing entity in response to a lacking of the memory block in the local mass memory of the target data-processing entity, or retrieving the memory block from the local mass memory of the target data-processing entity otherwise.

13. A system for migrating a software image installed on a source data-processing entity to a target data-processing comprising:
   a processor; and
   a memory coupled to the processor, wherein the memory comprises instructions which, when executed by the processor, cause the processor to:
   boot the target data-processing entity from a preliminary bootstrap program providing a standalone preliminary operative system,
   mount the software image as a remote mass memory on the target data-processing entity,
   copy a primary bootstrap program of the software image onto a local mass memory of the target data-processing entity, the primary bootstrap program comprising a streaming function adapted to migrate the software image to the target data-processing entity,
   re-boot the target data-processing entity from the primary bootstrap program on the local mass memory of the target data-processing entity thereby loading the streaming function, and
   serve east request of accessing a memory block on the target data-processing entity by the streaming function, the streaming function downloading the memory block from the software image installed on the source data-processing entity and storing the memory block into the local mass memory of the target data-processing entity in response to a lacking of the memory block in the local mass memory of the target data-processing entity otherwise.

14. The system according to claim 13, wherein for each request of accessing the memory block in an update mode the instructions further cause the processor to:
   update the memory block in the local mass memory of the target data-processing entity.

15. The system according to claim 13, wherein the instructions further cause the processor to:
   disable the streaming function for retrieving each memory block directly from the local mass memory of the target data-processing entity in response to the storing of a number of memory blocks corresponding to a size of the software image in the local mass memory of the target data-processing entity.

16. The system according to claim 13, wherein the instructions further cause the processor to:
   monitor a workload of the target data-processing entity or the source data-processing entity, and
   download a set of selected memory blocks being not stored in the local mass memory of the target data-processing entity from the software image installed on the source data-processing entity and storing the selected memory blocks into the local mass memory of the target data-processing entity in response to the workload falling below a threshold value.

17. The system according to claim 13, wherein the target data-processing entity is a target physical computer, and wherein the instructions to boot the target data-processing entity from the preliminary bootstrap program further cause the processor to comprises:
   boot the target physical computer from a network bootstrap program.

18. The system according to claim 13, wherein the target data-processing entity is a target virtual machine running on a target hypervisor, and wherein the instructions to boot the target data-processing entity from a preliminary bootstrap program further causes the processor to:
   boot the target virtual machine from a booting virtual disk external to the target virtual machine.

19. The system according to claim 18, wherein the instructions to boot the target virtual machine from the booting virtual disk further causes the processor to:
   download the booting virtual disk by the target hypervisor.

20. The system according to claim 18, wherein the instructions to boot the target virtual machine from the booting virtual disk further causes the processor to:
   change a boot sector of the target virtual machine to point to the booting virtual disk.

* * * * *